United States Patent [19]

Hasebe

[11] 4,176,943

[45] Dec. 4, 1979

[54] ELECTROPHOTOGRAPHIC APPARATUS

[75] Inventor: Mitsuo Hasebe, Tokyo, Japan

[73] Assignee: Ricoh Company, Ltd., Tokyo, Japan

[21] Appl. No.: 840,614

[22] Filed: Oct. 11, 1977

[30] Foreign Application Priority Data

| | | | |
|---|---|---|---|
| Oct. 18, 1976 | [JP] | Japan | 51/124670 |
| Nov. 18, 1976 | [JP] | Japan | 51/138980 |
| Nov. 18, 1976 | [JP] | Japan | 51/138981 |

[51] Int. Cl.$^2$ .................. G03G 15/00; G03B 27/76

[52] U.S. Cl. .................. 355/14 R; 355/67; 355/71

[58] Field of Search .................. 355/3 R, 14, 67, 71

[56] References Cited

U.S. PATENT DOCUMENTS

| | | | |
|---|---|---|---|
| 3,535,111 | 10/1970 | Pope | 355/3 R X |
| 3,762,811 | 10/1973 | Matsumoto | 355/3 R |
| 3,788,739 | 1/1974 | Coriale | 355/3 R X |
| 3,990,791 | 11/1976 | Tsukada | 355/3 R |
| 4,087,171 | 5/1978 | Yano | 355/14 |

*Primary Examiner*—Fred L. Braun
*Attorney, Agent, or Firm*—David G. Alexander

[57] ABSTRACT

An electrostatic potential is induced onto an electrode from a photoconductive member such as a drum in accordance with the electrostatic potential of a background area of an electrostatic image on the drum. An intensity of light radiation of the drum is controlled in accordance with the induced potential. The light radiation may be radiation of a light image to form the electrostatic image or subsequent uniform radiation. The induced electrostatic potential may be used to control an exposure aperture device such as a device defining a variable width slit. In another embodiment of the invention the electrode is in the form of an occluder plate and is positioned by electrostatic force to block the light radiation to a variable degree in accordance with the induced electrostatic potential.

14 Claims, 12 Drawing Figures

ELECTROPHOTOGRAPHIC APPARATUS

BACKGROUND OF THE INVENTION

The present invention relates to an electrophotographic apparatus comprising an improved exposure means.

In a typical electrophotographic apparatus such as an electrostatic copying machine a photoconductive member such as a drum is uniformly charged and radiated with a light image of an original document to form an electrostatic image through localized photoconduction. A toner substance is applied to the drum to develop the electrostatic image into a visible toner image which is transferred and fixed to a copy sheet to provide a permanent reproduction of the original document.

Various conditions can cause blank background areas of copies to print gray rather than white. One cause is that the original document has a colored, rather than a white background. Numerous office documents such as slips are blue, pink, etc. in color. Another cause is variations in the operation of a corona charging unit due to variations in temperature, humidity, supply voltage and the like. Either condition will cause the electrostatic potential of background areas of the electrostatic image on the drum to have a value which differs from the desired value. In the case of colored documents, due to the spectral sensitivity characteristics of known photoconductive substances, photoconductive drums are generally less sensitive to colored light than to white light. Thus, the electrostatic potential of background areas of electrostatic images of colored documents will be excessive and the background areas will print gray rather than white. In the case of variations in the charge intensity of the drum prior to exposure, the background areas of the electrostatic image may have too high or too low potential. Excessive potential causes gray background areas. Insufficient potential causes the dark areas to appear washed out.

Such a problem may be overcome by varying the intensity of the light image in accordance with the electrostatic image potential. In the case of colored documents, an exposure increase will cause the background areas to print white as desired. For every value of electrostatic background area potential within the practical limitations of the apparatus there is a value of light image intensity which will produce a proper copy. However, electrophotographic apparatus known heretofore has not been available which is capable of satisfactorily controlling light image or exposure intensity in accordance with eletrostatic image potential.

SUMMARY OF THE INVENTION

The present invention overcomes these drawbacks of the prior art by placing an electrode in the vicinity of the photoconductive drum and sensing the electrostatic potential induced on the electrode by the drum. The sensed potential is utilized to control the exposure intensity. The electrode may be movably provided in the optical path of the light image and be positioned by electrostatic force to variably block the light image. Alternatively, the electrode may be fixed and the induced potential applied to an exposure aperture means such as a variable width slit to control the exposure.

It is an object of the present invention to provide an electrophotographic apparatus comprising an improved exposure control means.

It is another object of the present invention to eliminate gray backgrounds from copies.

It is another object of the present invention to sense the electrostatic potential of an electrostatic image on a photoconductive member and control exposure of the member in accordance therwith.

It is another object of the present invention to produce good copies of original documents having colored background areas.

It is another object of the present invention to compensate for variations of electrostatic charge formed on a photoconductive member due to variations in the output of a corona charging unit.

It is another object of the present invention to compensate for variation of an electrostatic charge formed on a photoconductive sheet having a photoconductive toner substance formed thereon due to variations in the electrical characteristics of the sheet.

It is another object of the present invention to provide a generally improved electrophotographic apparatus.

Other objects, together with the foregoing, are attained in the embodiments described in the following description and illustrated in the accompanying drawing.

DESCRIPTION OF THE PREFERRED EMBODIMENTS

While the electrophotographic apparatus of the invention is susceptible of numerous physical embodiments, depending upon the environment and requirements of use, substantial numbers of the herein shown and described embodiments have been made, tested and used, and all have performed in an eminently satisfactory manner.

Figure 3:
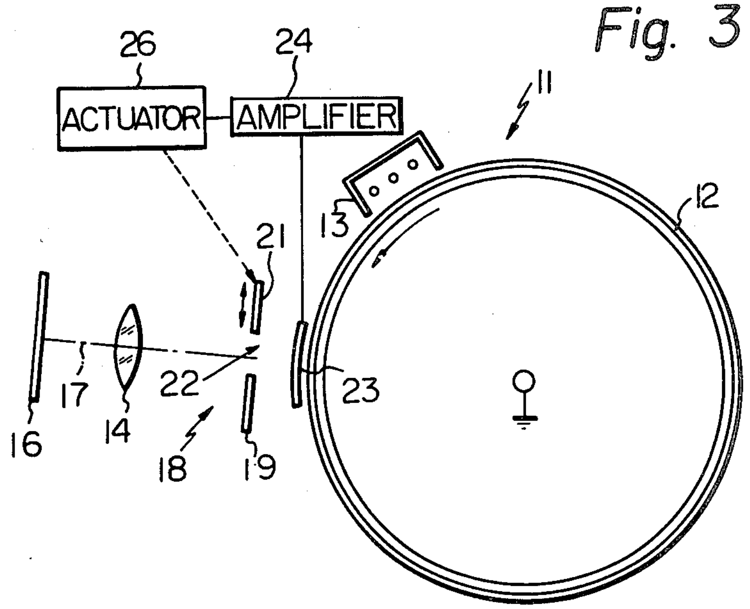
FIG. 3 is a schematic view of a first embodiment of an electrophotographic apparatus embodying the present invention.

Referring now to the drawing, an electrophotographic apparatus embodying the present invention is illustrated in FIG. 3 and designated by the reference numeral 11. A photoconductive drum 12 is driven for counterclockwise rotation at constant speed. Although the detailed construction of the drum 12 is not the subject matter of the present invention and is not shown in detail, the drum 12 is basically formed of a grounded metal core on which is formed a photoconductive layer. A corona charging unit 13 applies a uniform electrostatic charge onto the drum 12 and an optical system which is symbolized by a converging lens 14 focusses a light image of an original document 16 onto the drum 12. The optical axis of the light image is indicated by a dot and dash line 17. An aperture means 18 comprises a lower fixed plate 19 and an upper movable plate 21 which define therebetween an exposure aperture or slit 22 of variable width. The intensity of the light image on the drum 12 depends on the width of the slit 22.

Imaging of the drum 12 causes an electrostatic image to be formed through localized photoconduction. Although not shown, a developing unit applies a toner substance to the drum 12 to develop the electrostatic image into a toner image which is transferred and fixed to a copy sheet to provide a permanent reproduction of the original document 16.

Figure 1:
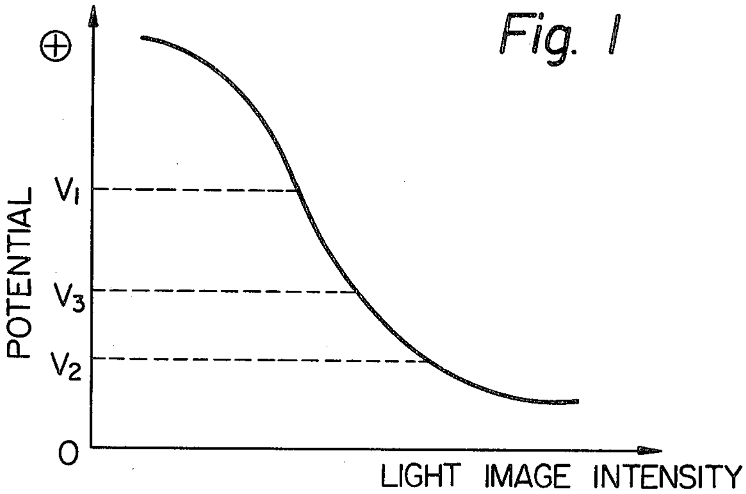
FIG. 1 is a graph illustrating a cause of gray background areas in copies of documents having colored backgrounds.

FIG. 1 illustrates the electrostatic image potential on the drum 12 for various kinds of original documents. The potential decreases as the light image intensity is increased. A potential $V_1$ corresponds to the dark areas of the image. A potential $V_2$ corresponds to the background image areas of a document having a white background. Similarly, a potential $V_3$ corresponds to the background image areas of a document having a colored background.

It will be seen that the potential $V_3$ is higher than the potential $V_2$. Thus, if the drum 12 is given the amount of exposure required to produce a white background in a copy of an original document having a white background, the background areas of a copy of an original document having a colored background will print gray. Since most copies are made of documents constituted by printed pages, a gray background will make the copies very hard to read. However, if the exposure is increased while copying colored documents so that the background potential is reduced from $V_3$ to $V_2$, the copy will print with a white background.

Although it is possible to predetermine the exposure required for documents having background areas of various colors, such a procedure is subject to error and does not compensate for variations in the output of the corona charging unit 13 due to variations in temperature, humidity, supply voltage and the like. In addition, the present invention is also applicable to a process in which a light image is radiated onto a copy sheet formed with a photoconductive coating of toner substance. The electrostatic potential on such sheets varies in accordance with the manufacturing tolerances and storage conditions of the sheets.

The apparatus 11 takes all of these factors into account and produces high quality copies of original documents of any color. To accomplish this object, the apparatus 11 comprises a transparent electrode 23 which is provided in close proximity to the drum 12 and through which the light image is radiated onto the drum 12. The electrode 23 may be made of an electrically conductive glass which is marketed under the trademark NESA.

The electrode 23 may be constructed so as to cover a large area of the light image or alternatively to cover only an edge or similar area which almost always corresponds to a background area. In either case, an electrostatic potential is induced on the electrode 23 by the drum 12 which corresponds in magnitude to the intensity of the background areas of the electrostatic image on the drum 12. An amplifier 24 or other electrical circuit is provided to produce an electrical control signal corresponding to the electrostatic potential on the electrode 23. The control signal is applied to an actuator 26 which movably controls the position of the plate 21 of the aperture means 18.

The amplifier 24 may comprise any known type of linear or non-linear circuitry known in the art to produce the control signal as a function of the induced electrostatic potential on the electrode 23 such that the width of the slit 22 provides the correct light image intensity as illustrated in FIG. 1. Generally, the light image intensity is increased as the sensed electrostatic potential increases and, as mentioned hereinabove, there is a correct value of light image intensity for each value of electrostatic potential. The amplifier 24 is constructed to provide this function.

Thus, it will be seen that the present apparatus 11 compensates for all variables which affect the electrostatic image potential in the background areas such as the color of the background areas of the original document and variations in the output of the corona charging unit 13.

Figure 5:
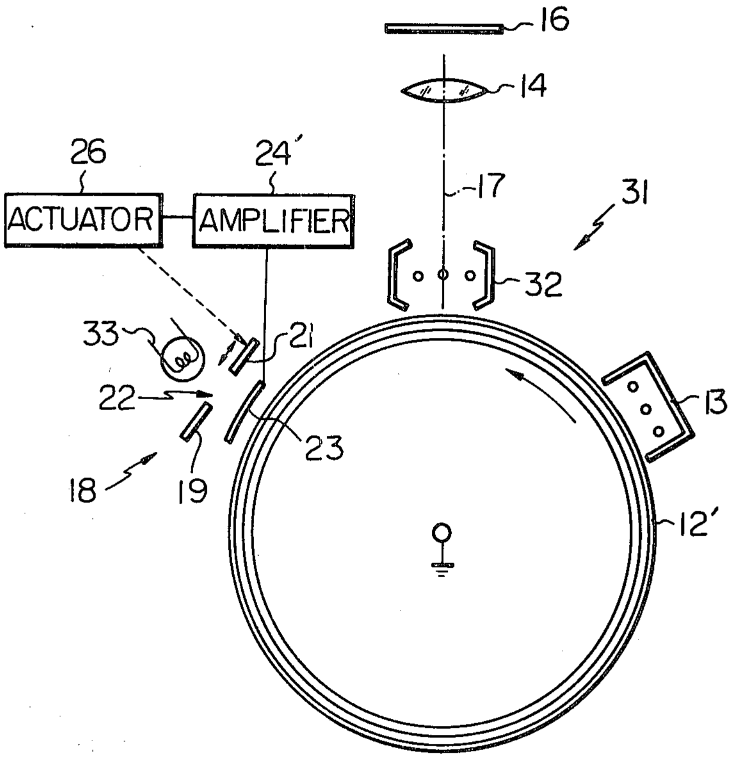
FIG. 5 shows a modification of the first embodiment.

FIG. 5 shows how the present invention may be adapted to another type of electrophotographic process. Like elements are designated by the same reference numerals and corresponding but slightly modified elements are designated by the same reference numerals primed.

In an apparatus 31 shown in FIG. 5 the drum 12' has, in addition to the photoconductive layer, an electrically insulative layer formed on top of the photoconductive layer. The drum 12' is initially charged by the corona charging unit 13 and then simultaneously radiated with the light image of the original document 16 by the lens 14 and uniformly charged by a corona charging unit 32. Thereafter, the drum 12 is illuminated with a uniform light image from a light source 33. In other words, the surface of the drum 12' is uniformly illuminated by the light source 33. The aperture means 18 in the apparatus 31 is provided with a light source 33 rather than used to control the intensity of the light image focussed on the drum 12 by the lens 14.

Figure 2:
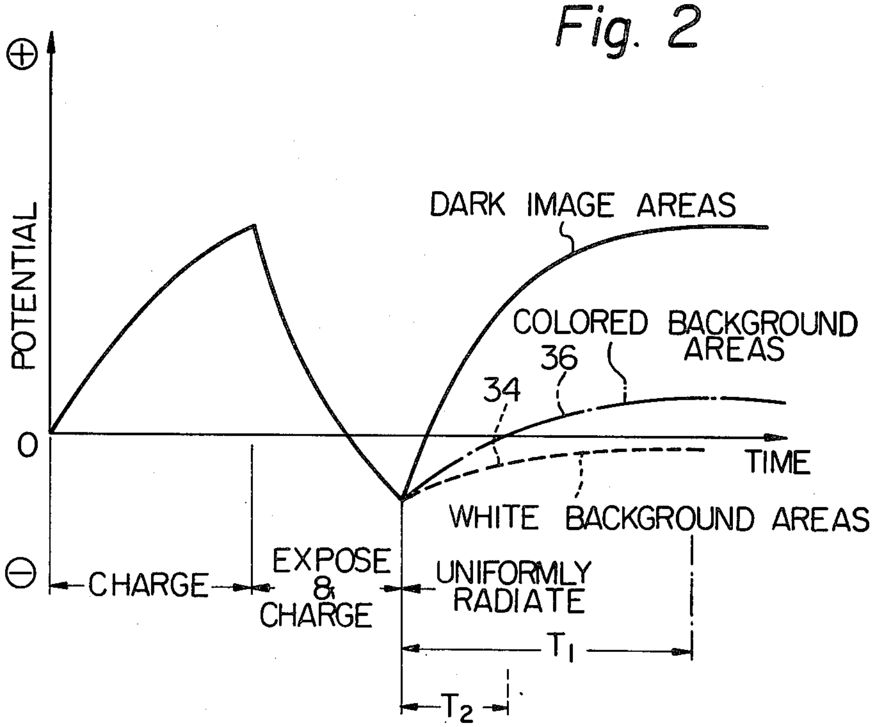
FIG. 2 is also a graph illustrating a similar cause of gray background areas in another electrophotographic process.

The sensor 23 provides an output to a modified amplifier 24' and the actuator 26 to control the uniform light image intensity. This operation is illustrated in FIG. 2, in which the charging, simultaneous exposure with the light image and charging, and uniform light radiation are clearly shown and labeled. For copying documents with white background areas, the uniform light exposure produces a background image potential which varies with time as shown by a curve 34. If the same exposure is provided for a document having a colored background, the potential will be excessive as indicated by a curve 36. Therefore, the uniform light exposure must be increased in intensity for copying colored documents so that the potential will follow the curve 34. This function is provided by the amplifier 24'.

It is also possible to vary the exposure by varying the voltage applied to the light source 33 or by varying the length of time the light source 33 is energized. Uniform illumination for a time $T_2$ will produce proper copies of white documents. Uniform exposure for an increased time $T_1$ will produce proper exposure of colored documents. This effect is illustrated in FIG. 2.

Figure 4:
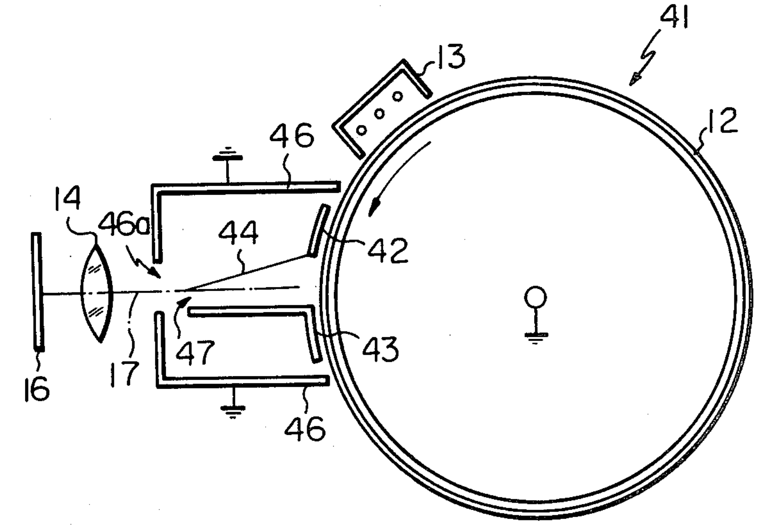
FIG. 4 similarly shows a second embodiment of the invention.

Another embodiment of the present invention is shown in FIG. 4 designated as 41. Electrodes 42 and 43 are provided closely adjacent to the drum 12 so that the light image passes therebetween. The electrode 43 has a rightward portion which is generally parallel to the surface of the drum 12 and a leftward portion which is generally perpendicular thereto. The electrode 42 comprises only a rightward portion but an occluder plate 44 extends leftwardly from the electrode 42. The electrodes 42 and 43 and the occluder plate 44 are electrically conductive, with the occluder plate 44 being mechanically and electrically connected at an edge thereof to the electrode 42. A grounded shield 46 encloses the electrodes 42 and 43 and occluder plate 44 but is formed with an aperture 46*a* so that the light image may pass therethrough.

The occluder plate 44 is made of a lightweight flexible material such as metal foil. In operation, an electrostatic charge having a polarity opposite to the polarity of the electrostatic image on the drum 12 is induced in the rightward portions of the electrodes 42 and 43. This causes an electrostatic charge having a polarity which is the same as that of the electrostatic image on the drum 12 to be induced on the leftward portion of the electrode 43 and also the occluder plate 44. Since the electrostatic charges on the leftward portion of the electrode 43 and on the occluder plate 44 are of the same polarity, the occluder plate 44 is repelled away from the electrode 43. Since the occluder plate 44 is made of a light flexible metal, it is caused by the electrostatic repulsive force to bend away from the electrode 43. This distance which the occluder plate 44 is repelled away from the electrode 43 increases with the magnitude of the electrostatic repulsive force which in turn increases with the magnitude of the electrostatic potential of the electrostatic image on the drum 12.

The leftward portion of the electrode 43 and the occluder plate 44 define therebetween a slit 47 which serves the same function as the slit 22 in FIG. 3 in that the intensity of the light image on the drum 12 depends on the width of the slit 47. The material and dimensions of the electrodes 42, 43 and occluder plate 44 as well as their positional relationships are selected so that the width of the slit 47 corresponds to the electrostatic potential on the drum 12 so that the correct light image intensity is provided under all conditions.

Figure 6:
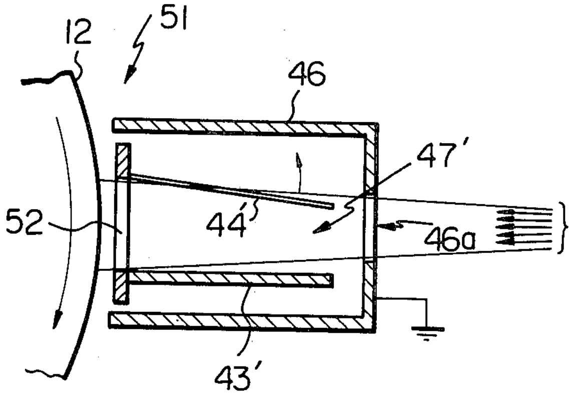
FIG. 6 shows a modification of the second embodiment.

FIG. 6 shows a modification of the apparatus 41 which is designated as 51. In this case, a transparent but electrically conductive electrode 52 is provided in close proximity to the drum 12. An electrode 43' is electrically connected to the electrode 52 and extends rightwardly therefrom. The occluder plate 44' is also electrically connected to the electrode 52 and extends rightwardly therefrom. The slit 47' is defined between the electrode 43' and occluder plate 44'.

In operation, an electrostatic potential having a polarity opposite to that of the electrostatic image on the drum 12 is induced on the electrode 52 and an electrostatic charge having a polarity which is the same as that of the electrostatic image on the drum 12 is induced in the ends of the electrode 43' and occluder plate 44'. The like charges cause the occluder plate 44' to be repelled away from the electrode 43' in the same manner as in the embodiment of FIG. 4. It will be noted that the light image passes through the electrode 52.

Figure 7:
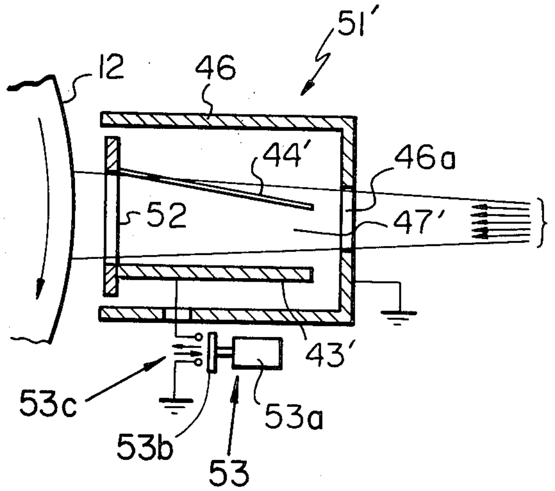
FIG. 7 shows a modification of the second embodiment.

Although the shield 46 partially encloses the electrodes 43' and 52 and occluder plate 44', it is impossible to completely shield these elements from the corona charging unit 13 since a space must be provided between the shield 46 and the drum 12. Thus, an excessive electrostatic potential tends to build up on the enclosed elements during prolonged operation of the apparatus 51. This causes erroneous operation of the light image control system. In order to overcome this problem, FIG. 7 shows how an electrical solenoid 53 may be provided to periodically and selectively ground the electrode 43' and thereby the electrode 52 and occluder plate 44' or connect the same to any other predetermined electrical potential. The solenoid 53 may be energized to ground said elements when the apparatus 51, designated in FIG. 7 as 51', is energized or between copying cycles.

The solenoid 53 comprises a body 53*a* in which is provided an electromagnetic coil (not shown). An electrically conductive plunger 53*b* is movable into and out of the body 53*a* as indicated by arrows. The plunger 53*b* is normally maintained in the position illustrated by conventional biasing means such as a return spring (not shown). The solenoid 53 further comprises a pair of switch contacts 53*c*, one of which is connected to the electrode 43' and the other of which is grounded. Energization of the coil causes the plunger 53*b* to be electromagnetically urged leftwardly out of the body 53*a* into engagement with the contacts 53*c* to connect the same together and thereby connect the electrode 43' to ground.

Figure 8:
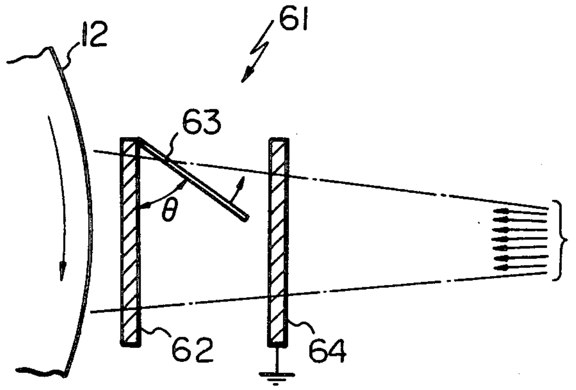
FIG. 8 shows a third embodiment of the invention.

FIG. 8 illustrates another embodiment of the invention which is designated as an apparatus 61 and comprises a transparent electrically conductive electrode 62 provided in close proximity to the drum 12 so that an electrostatic charge is induced thereon. An occluder plate 63 is fixed at its upper edge to the upper edge of the electrode 62. In operation, like electrostatic charges are induced on the rightward surface of the electrode 62 and the free end portion of the occluder plate 63 so that the occluder plate 63 is electrostatically repelled from the electrode 62 to an angle $\theta$ which depends on the magnitude of the induced electrostatic charge. The angle $\theta$ increases with the induced potential so that the light image is progressively unblocked as the electrostatic potential increases. The apparatus 61 further comprises a second transparent electrode 64 which is electrically conductive and grounded. An electrostatic charge of a polarity opposite to the polarity of the electrostatic image on the drum 12 is induced on the electrode 64 by the free end portion of the occluder plate 63. As a result, the occluder plate 63 is attracted to the electrode 64 thereby increasing the angle $\theta$.

Figure 9:
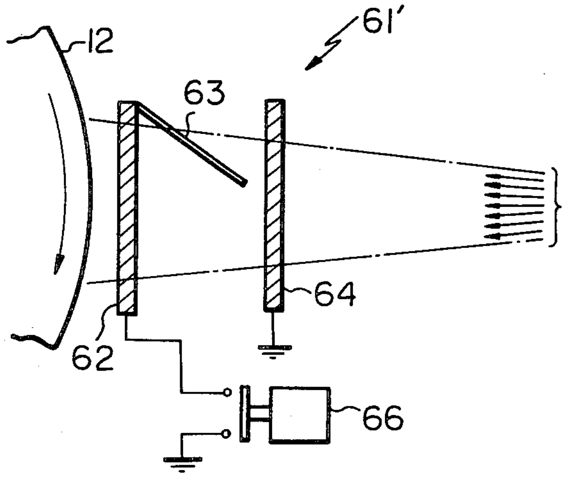
FIG. 9 shows a modification of the third embodiment.

FIG. 9 illustrates the apparatus 61, here designated as 61', as being provided with an electrical solenoid 66 to selectively ground the electrode 62 and thereby the occluder plate 63.

Figure 10:
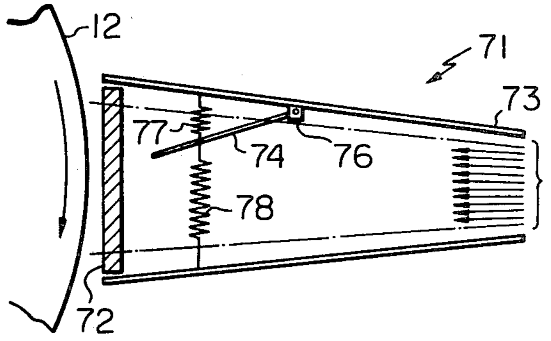
FIG. 10 shows a fourth embodiment of the invention.

FIG. 10 illustrates another apparatus 71 embodying the present invention which comprises a transparent electrode 72 disposed closely adjacent to the drum 12. A shield 73 which may or may not be electrically grounded encloses the electrode 72 and is formed with an opening (not designated) for the light image. An occluder plate 74 is pivotally supported by the shield 73 through a pivot shaft 76. The occluder plate 74 is preferably electrically connected to the shield 73, and is formed of a rigid electrically conductive material.

The left portion of the occluder plate 74 is disposed adjacent to the electrode 72 and is yieldably supported by springs 77 and 78 which are connected together at their ends between the walls of the shield 73. The junction of the springs 77 and 78 is connected to the occluder plate 74. If desired, the springs 77 and 78 may be made integral.

The occluder plate 74 is maintained in a maximum counterclockwise position by the springs 77 and 78 in the absence of any induced electrostatic charge on the electrode 72, thereby blocking the light image to a maximum extent. However, as an electrostatic charge of the opposite polarity to the polarity of the electrostatic image on the drum 12 is induced on the left side of the electrode 72, a charge of the same polarity as the electrostatic image is induced on the right side thereof. This induces a charge of the opposite polarity to the electrostatic image on the leftward portion of the occluder plate 74. Thus, the occluder plate 74 is electrostatically attracted to the electrode 72.

Figure 11:
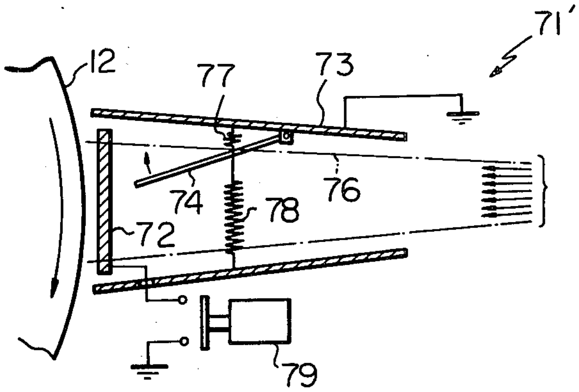
FIG. 11 shows a modification of the fourth embodiment.

This attraction causes the occluder plate to pivot clockwise thereby increasing the intensity of the light image. The greater the electrostatic potential, the greater the clockwise movement of the occluder plate 74. The electrostatic force is balanced against the forces of the springs 77 and 78 which are selected to provide the correct light image intensity as a function of electrostatic potential. FIG. 11 shows the apparatus 71, here designated as 71', as provided with a solenoid 79 for selectively grounding the electrode 72.

Figure 12:
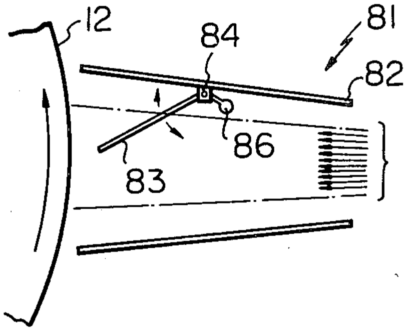
FIG. 12 shows a fifth embodiment of the invention.

FIG. 12 shows yet another embodiment 81 of the present invention which comprises a shield 82. An occluder plate 83 made of a rigid electrically conductive material is pivotally supported by the shield 82 through a pivot shaft 84. The free end of the occluder plate 83 extends adjacent to the drum 12. A counterweight 86 is provided at the right end of the occluder plate 83 on the opposite side of the pivot shaft 84.

In operation, an electrostatic charge having a polarity opposite to that of the electrostatic image on the drum 12 is induced in the left end portion of the occluder plate 83 which causes the occluder plate 83 to be attracted toward the drum 12. This movement is resisted by the counterweight in a predetermined and calibrated manner. Thus, the light image intensity is increased as the electrostatic potential increases in the desired manner.

In summary, it will be seen that the present invention overcomes the problems of the prior art and provides copies with white backgrounds regardless of the color of the original document and any other variables. Various modifications will become possible for those skilled in the art after receiving the teachings of the present disclosure without departing from the scope thereof.

What is claimed is:

1. An electrophotographic apparatus comprising:
- charging means for forming an electrostatic charge on a photoconductive member;
- imaging means for radiating a light image of an original document onto the photoconductive member to form an electrostatic image thereon through localized photoconduction;
- sensor means for sensing an electrostatic potential of the electrostatic image; and
- control means for controlling an intensity of light radiation of the photoconductive member in accordance with the sensed electrostatic potential;
- the control means comprising an occluder plate movably provided in an optical path of the light image for varying the intensity of the light image in accordance with a position of the occluder plate, the occluder plate being disposed closely adjacent to the photoconductive member, the occluder plate being positioned by electrostatic force in accordance with an electrostatic potential induced thereon by the photoconductive member.

2. An apparatus as in claim 1, in which the control means further comprises an electrode disposed closely adjacent to the photoconductive member so as to have an electrostatic potential induced thereon by the photoconductive member, the electrostatic force being produced between the occluder plate and the electrode.

3. An apparatus as in claim 2, in which the electrode comprises an electrically conductive transparent plate through which the light image is radiated onto the photoconductive member.

4. An apparatus as in claim 3, in which the transparent plate is disposed between the photoconductive member and the occluder plate.

5. An apparatus as in claim 4, in which the occluder plate is mechanically and electrically separate from the transparent plate, the control means further comprising spring means for balancing the occluder plate at a predetermined normal position.

6. An apparatus as in claim 4, in which the occluder plate is mechanically and electrically connected to the transparent plate at an edge thereof.

7. An apparatus as in claim 6, further comprising a second electrode disposed between the imaging means and the occluder plate in such a manner that an electrostatic potential is induced on the second electrode and an electrostatic force developed between the occluder plate and the second electrode.

8. An apparatus as in claim 1, in which the control means further comprises means for pivotally supporting the occluder plate and a counterweight provided to the occluder plate.

9. An apparatus as in claim 1, in which the control means is constructed in such a manner that the electrostatic force on the occluder plate is attractive.

10. An apparatus as in claim 1, in which the control means is constructed in such a manner that the electrostatic force on the occluder plate is repulsive.

11. An electrophotographic apparatus comprising:
- charging means for forming an electrostatic charge on a photoconductive member;
- imaging means for radiating a light image of an original document onto the photoconductive member to form an electrostatic image thereon through localized photoconduction;
- sensor means for sensing an electrostatic potential of the electrostatic image; and
- control means for controlling an intensity of light radiation of the photoconductive member in accordance with the sensed electrostatic potential;
- the sensor means comprising an electrode disposed closely adjacent to the photoconductive member, the apparatus further comprising means for selectively connecting the electrode to a predetermined electrostatic potential.

12. An apparatus as in claim 11, in which said means for selectively connecting the electrode to a predetermined electrostatic potential comprises an electrical solenoid.

13. An apparatus as in claim 11, in which the predetermined electrostatic potential is ground potential.

14. An apparatus as in claim 11, in which the control means is constructed to control an intensity of the light image.

* * * * *